United States Patent
Cypher et al.

(10) Patent No.: US 10,140,383 B2
(45) Date of Patent: Nov. 27, 2018

(54) COMPUTER IMPLEMENTED SYSTEMS AND METHODS FOR PROCESSING SEMI-STRUCTURED DOCUMENTS

(71) Applicants: Raymond Cypher, Sherwood Park (CA); Karl Kwong, Vancouver (CA)

(72) Inventors: Raymond Cypher, Sherwood Park (CA); Karl Kwong, Vancouver (CA)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 597 days.

(21) Appl. No.: 14/586,413

(22) Filed: Dec. 30, 2014

(65) Prior Publication Data

US 2016/0188746 A1   Jun. 30, 2016

(51) Int. Cl.
*G06F 17/30* (2006.01)

(52) U.S. Cl.
CPC .. *G06F 17/30908* (2013.01); *G06F 17/30011* (2013.01); *G06F 17/30867* (2013.01); *G06F 17/30914* (2013.01); *G06F 17/30961* (2013.01)

(58) Field of Classification Search
CPC ......... G06F 17/30908; G06F 17/30867; G06F 17/30961
See application file for complete search history.

(56) References Cited

U.S. PATENT DOCUMENTS

| 7,523,158 B1 | 4/2009 | Nickerson et al. |
| 8,887,099 B1 | 11/2014 | Simeloff |
| 2003/0020749 A1* | 1/2003 | Abu-Hakima ......... G06Q 10/10 715/752 |
| 2003/0120642 A1* | 6/2003 | Egilsson ............. G06F 17/3061 |
| 2005/0086639 A1* | 4/2005 | Min ..................... G06F 17/2205 717/114 |
| 2005/0203933 A1* | 9/2005 | Chaudhuri ........ G06F 17/30917 |
| 2005/0240881 A1 | 10/2005 | Rush et al. |
| 2006/0174209 A1* | 8/2006 | Barros .................. G06F 3/0483 715/764 |
| 2006/0242180 A1* | 10/2006 | Graf ................... G06F 17/30917 |
| 2008/0005094 A1* | 1/2008 | Cunnane ............. G06F 17/2745 |
| 2012/0179713 A1* | 7/2012 | Stolte ................ G06F 17/30592 707/769 |
| 2014/0115013 A1* | 4/2014 | Anderson ......... G06F 17/30312 707/812 |

OTHER PUBLICATIONS

U.S. Appl. No. 14/586,290, filed Dec. 30, 2014, entitled "Computer Implemented Systems and Methods for Processing Semi-Structured Documents," inventors: Raymond Cypher and Karl Kwong.

* cited by examiner

*Primary Examiner* — Syling Yen
*Assistant Examiner* — Soheila (Gina) Davanlou
(74) *Attorney, Agent, or Firm* — Fountainhead Law Group P.C.

(57) ABSTRACT

The present disclosure includes techniques pertaining to computer implemented systems and methods for processing semi-structured data. In one embodiment, semi-structured data in a data source is analyzed and structural information about the data is generated. Structural information may be accessed and used to generate a visual representation of the document structures. User selections may be received of particular fields to be included in an output data set. Data for selected fields may be stored in the output data set as a two-dimensional data structure.

15 Claims, 19 Drawing Sheets

| Doc ID | name | age | address.city |
|---|---|---|---|
| 0 | Bird Holt | 21 | Condon |
| 1 | Cooper Whitney | 18 | Klagetoh |
| 2 | Leila Sawyer | 40 | Wanamie |
| 3 | Rae Avila | 20 | Welch |
| 4 | Sherry Velez | 31 | Nescatunga |
| 5 | Doyle Sandoval | 19 | Galesville |
| 6 | Monica Parsons | 21 | Alfarata |
| 7 | Nash Beard | 19 | Stouchsburg |
| 8 | Kelli Oneill | 18 | Mulberry |
| 9 | Morrison Warner | 22 | Clarence |
| 10 | Lora Bright | 20 | Ruckersville |

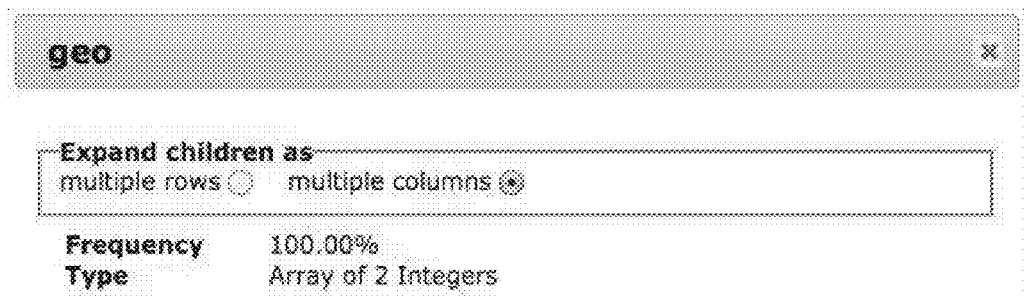

geo

Expand children as
multiple rows ○   multiple columns ⦿

Frequency  100.00%
Type       Array of 2 Integers

*Fig. 7*

| Doc ID | name | age | address.city | geo.0.geo | geo.1.geo |
|---|---|---|---|---|---|
| 0 | Bird Holt | 21 | Condon | -12 | 83 |
| 1 | Cooper Whitney | 18 | Klagetoh | 18 | -84 |
| 2 | Leila Sawyer | 40 | Wanamie | 12 | 71 |
| 3 | Rae Avila | 20 | Welch | -53 | -152 |

*Fig. 8*

| Doc ID | name | age | address.city | geo.geo |
|---|---|---|---|---|
| 0 | Bird Holt | 21 | Condon | -12 |
| 0 | Bird Holt | 21 | Condon | 83 |
| 1 | Cooper Whitney | 18 | Klagetoh | 18 |
| 1 | Cooper Whitney | 18 | Klagetoh | -84 |
| 2 | Leila Sawyer | 40 | Wanamie | 12 |
| 2 | Leila Sawyer | 40 | Wanamie | 71 |
| 3 | Rae Avila | 20 | Welch | -53 |
| 3 | Rae Avila | 20 | Welch | -152 |

*Fig. 9*

COMPUTER IMPLEMENTED SYSTEMS AND METHODS FOR PROCESSING SEMI-STRUCTURED DOCUMENTS

CROSS REFERENCE TO RELATED APPLICATIONS

The present application contains subject matter related to the subject matter in the following concurrently filed patent application: U.S. patent application Ser. No. 14/586,290, which is currently pending and entitled "Computer Implemented Systems and Methods for Processing Semi-Structured Documents."

BACKGROUND

The present disclosure relates to computing and data processing, and in particular, to computer implemented systems and methods for processing semi-structured documents.

Traditionally, data has been stored in a highly structured manner. For example, common databases such as SQL databases store data as records, where each record is a row of a table, and the columns of the table are fields representing particular data elements such as name, address, price, etc. . . . . Structured data storage typically includes a schema, which defines the structure of how the data is stored so that queries may be generated and executed to retrieve specific data from the database.

However, recently there has been an increase in the storage of unstructured or semi-structured data. Semi-structured data may be stored in a database as a document, where different documents may have different fields and different structures. For example, documents may have fields such as "first name" and "age," and other information may be stored as subdocuments or associated arrays of information, for example. Different documents in the same database may have different fields, or the same fields or overlapping fields with other documents may be structured in different ways and not normalized.

A common situation is to have a set of semi-structured data instances that are grouped into a collection or set where the data items do not have identical structure. This often occurs when working with non-SQL databases such as MongoDB or Cassandra, for example. In this case, there is no database schema defining the structure of items as there is no set structure. An example would be items that represent a customer and their purchase history. The information can vary from one customer to the next. When working with the data, a user is hampered by not knowing what information is present due to the lack of a single schema. For example, if only some of the data items have information about the customer's children, a user may not know that that information is available to work with unless they look at a data item which happens to contain information about children. However, unstructured or semi-structured data stores may hold hundreds, thousands, hundreds of thousands, or more of such documents.

Accordingly, storing, accessing, and processing semi-structured data is a technical computing problem in need of a solution.

SUMMARY

The present disclosure includes techniques pertaining to computer implemented systems and methods for processing semi-structured data. In one embodiment, semi-structured data in a data source is analyzed and structural information about the data is generated. Structural information is used to create a visualization of the data for presentation to a user. A user may specify particular fields in the corpus to extract, and the user may apply filters or other operations to the data. The semi-structured data may be extracted into an output data set as a two-dimensional data structure.

In one embodiment, the present disclosure includes a computer implemented method comprising analyzing, by a computer system, a plurality of semi-structured documents in a data store, generating structural information about the plurality of semi-structured documents, displaying the structural information as a graphical tree comprising nodes and leaf nodes, wherein nodes represent fields in the semi-structured documents and leaf nodes represent particular values, specifying particular nodes to include in an output data set, extracting, from the data store, particular fields corresponding to the particular nodes from the plurality of semi-structured documents, and storing the extracted particular fields in the output data set as a two-dimensional data structure.

In another embodiment, the present disclosure includes a computer implemented method comprising accessing, from a computer memory, information representing structure of a plurality of semi-structured documents, wherein the plurality of semi-structured documents comprise a plurality of fields having associated values, generating, by one or more computers, a visual representation of the information representing structure of the plurality of semi-structured documents, the visual representation comprising graphical elements corresponding to the plurality of fields, outputting, by the one or more computers, the visual representation to a display, receiving, in the one or more computers, information representing a user selection to include one or more particular fields of the plurality of fields in an output data set, and storing the selected particular fields in the output data set as a two-dimensional data structure.

The following detailed description and accompanying drawings provide a better understanding of the nature and advantages of the present disclosure.

BRIEF DESCRIPTION OF THE DRAWINGS

FIG. 7 illustrates an example collection according to one embodiment.

FIG. 8 illustrates an example method of flattening a collection according to one embodiment.

FIG. 9 illustrates an example method of flattening a collection according to another embodiment.

DETAILED DESCRIPTION

Described herein are techniques for computer implemented systems and methods for processing semi-structured documents. The apparatuses, methods, and techniques described below may be implemented as a computer program (software) executing on one or more computers. The computer program may further be stored on a tangible non-transitory computer readable medium, such as a memory or disk, for example. A computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
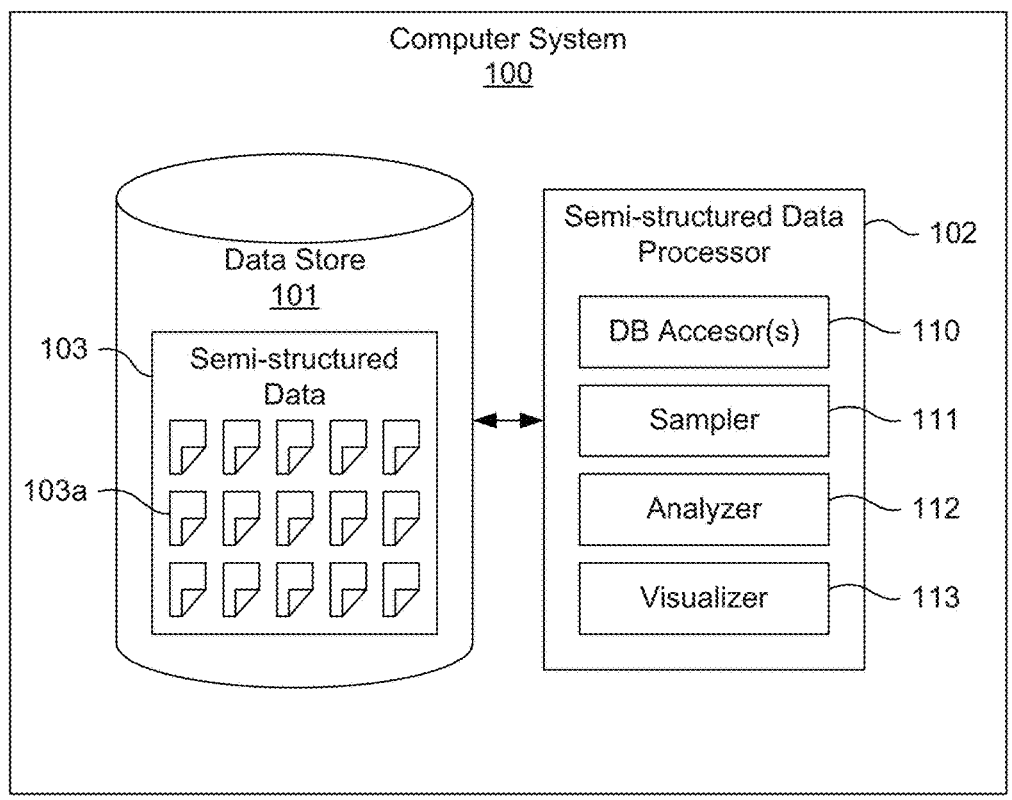
FIG. 1 illustrates a computer system including a semi-structured data store and semi-structured data processor according to one embodiment.

FIG. 1 illustrates a computer system 100 including a semi-structured data store and semi-structured data processor according to one embodiment. Features and advantages of the present disclosure offer a technical solution to the technical problem of processing semi-structured data. In this example, a data store 101 stores semi-structured data, such as documents. Examples of data store 101 may be a database such as MongoDB, Cassandra, or another noSQL or denormalized storage system, for example. For instance, MongoDB (from "humongous") is a cross-platform document-oriented database. Classified as a NoSQL database, MongoDB eschews the traditional table-based relational database structure in favor of Java Script Object Notation (JSON)-like documents with dynamic schemas (MongoDB calls the format BSON), making the integration of data in certain types of applications easier and faster. BSON is a computer data interchange format used mainly as a data storage and network transfer format in the MongoDB database. It is a binary form for representing simple data structures and associative arrays (called objects or documents in MongoDB). The name "BSON" is based on the term JSON and stands for "Binary JSON."

Generating Structural Information

One technical challenge in processing semi-structured documents is that different documents may have different fields, the overlapping fields stored in the same or different ways, or collections comprising arrays of fields or subdocuments with further semi-structured data, for example. Accessing and processing such documents on a computer is challenging because there is no unified structure or schema to operate on. Features and advantages of one aspect of the present disclosure receive semi-structured documents and analyze the documents using statistics to produce structural information that may be used to visualize and access the data in a meaningful way.

Computer system 100 includes a semi-structured data processor 102, which may be one or more software components, which when executed by a computer processor, may perform the functions described herein. Semi-structured data processor may include a database (DB) accessor (s) 110, sampler 111, analyzer 112 and visualizer 113. Different DB accessors 110 may be used to connect to, and access information in, different types of databases, for example. As set forth in more detail below, some example implementations of the present disclosure may include sampling documents and generating statistics over the sample set for determining a common structure. Sampler 111 may retrieve documents from the data store 101 based on specified sampling strategies. Analyzer 112 may receive the documents (all documents or sampled documents) and to determine particular fields in the semi-structured documents received from a semi-structured data store, for example. Analyzer 112 may generate statistics over the document set pertaining to, for example, a frequency that particular fields appear in the received documents, data types for the data associated with particular fields, sizes of collections associated with particular fields (e.g., min or max values), and/or a number of unique values, for example. In some embodiments, analyzer 112 may perform similarity analysis as described in more detail below. The statistics and results of analyzer 112 may be stored (e.g., in a computer memory) for access by visualizer 113. Visualizer 113 presents a generated structure for semi-structured to a user, for example. The computer system may receive inputs from a user, for example, to control the data processing steps.

In one embodiment, semi-structured documents in a collection may comprise fields and associated values. For example, the fields and values may be sets of field-data pairs, where each field-data pair has a field name and a data value. The value for a field name can be an atomic value (e.g., a number, a word), a collection of values, or another document. The name is referred to as a field.

The documents in a collection are referred to as semi-structured because they are not completely devoid of any structure whatsoever (i.e., they are not totally and completely unstructured). Rather, the documents in data store 101 may have varying structure that can be discerned through an analysis of the documents. This results in the need to generate an all-encompassing structure to let a user understand the nature of the data in the collection, for example. Semi-structured data may include forms of structured data that do not conform with the formal structure of data models associated with relational databases or other forms of data tables, but may nonetheless (in some cases) contains tags or other markers to separate semantic elements and enforce hierarchies of records and fields within the data. Therefore, semi-structured data includes data that may comprise a self-describing structure, for example.

The structure information is computer generated by analyzing the documents in the collection. All the documents in the collection can be analyzed or, for efficiency, a subset (e.g., a sample) of the documents may be analyzed. As the documents are examined a superset of fields, collections, and sub-documents is generated. Furthermore, in some embodiments, statistics about the structure may be calculated. For example, how frequently a given field appears in the documents, types of a field, etc.

When choosing to examine a subset of the documents in the collection different sampling strategies may be specified for use. The following are strategies that may be applied by sampler 111 when retrieving data from the data store: first N documents, last N documents, N documents chosen at random, N documents evenly distributed through the corpus of documents, or a weighted selection of documents based on frequency of access, creation date, etc. In some embodiments, the sampling may be user defined where a user may set values for any variables; such as size of sample, etc.

The following are examples of semi-structured documents that may be received from a data store:

```
document 1:
{
    name: Fred
    age: 20
    gender: M
    address:
    recent_purchase_amounts: [10, 5, 4, 8, 15]
}
document 2:
{
    name: Jane
    gender: F
    age: 35
    address:
    children: [
        {
            name: Bart
            gender: M
            age: 10
        },
        {
            name: Lisa
            gender: F
            age: 8
        }
    ]
}
document 3:
{
    name: Joe
    gender: M
    age: 20
    address:
    children: [
        {
            name: Ben
            gender: M
            age: 10
        }
```

```
    }
    ]
    recent_purchase_amounts: [10, 8, 15]
}
```

These example documents contain information about customers. All documents have fields for name, age, gender, and address. The documents for Fred and Joe have a field for recent purchase amounts where the value of the field is a collection of numbers. The document for Jane does not contain any purchases but does contain information about her children. The Joe document also contains information about children. The children field value is a collection of sub-documents where each sub-document contains name, gender, and age fields.

Features and advantages of the present disclosure include generating a superset of structure information that may be used to visualize and extract documents having a wide range of structures. For example, in one embodiment, all (or a subset of) the documents in a collection are analyzed by a computer. A superset of structure information is generated based on the structures of all the examined items. In one example embodiment, statistics about the structure are generated as part of the process. Example statistics may provide information about frequency, degree of commonality, type variance, etc. This information may be used to generate a visualization of the data to a user to understand what information is available in the data store so it may be accessed more efficiently. Also, in some embodiments, the generated statistics may be used to determine the importance, availability, consistency, etc. for different parts of the structure and statistics can be used to determine the information they represent. Previously, it was computationally difficult to access large volumes of unstructured or semi-structured data on a computer because there was no unified structured (such as schema) to automate access. Embodiment described herein use computational techniques to generate structural information about the data so that computer automated techniques may be used to visualize and access the data more efficiently.

One example of generated structure information for a structural superset is shown below in Table 1. The statistics on the data may be used to inform a user what fields are present in the documents in the collection. These particular statistics provide information about how frequently the fields appear in the documents, the number of unique values, the type of value, and for collections the maximum and minimum size of the collection. It is to be understood that the data shown in Table 1 is only a simplified representation used for example purposes. The generated information is not limited to what is shown below.

TABLE 1

| Field | Freq. | Type | Max Size | Min Size | # Unique Values |
|---|---|---|---|---|---|
| Name | 100% | String | | | 3 |
| Gender | 100% | String | | | 2 |
| Age | 100% | Number | | | 3 |
| Address | 100% | String | | | |
| Children | 66.6% | Collection of documents | 2 | 1 | |
| Children.name | 100% | String | | | 3 |
| Children.age | 100% | Number | | | 2 |
| Children.gender | 100% | String | | | 2 |

TABLE 1-continued

| Field | Freq. | Type | Max Size | Min Size | # Unique Values |
|---|---|---|---|---|---|
| Recent_purchase_ amounts | 66.6% | Collection of numbers | 5 | 3 | 5 |

Using this generated structure information the user can determine how to query, analyze, edit, etc. the data in the collection. For example, in one embodiment described in more detail below, the data is stored in a computer memory, for example, as a tree structure and used to generating a visualization to facilitate manipulation and further processing.

Figure 2:
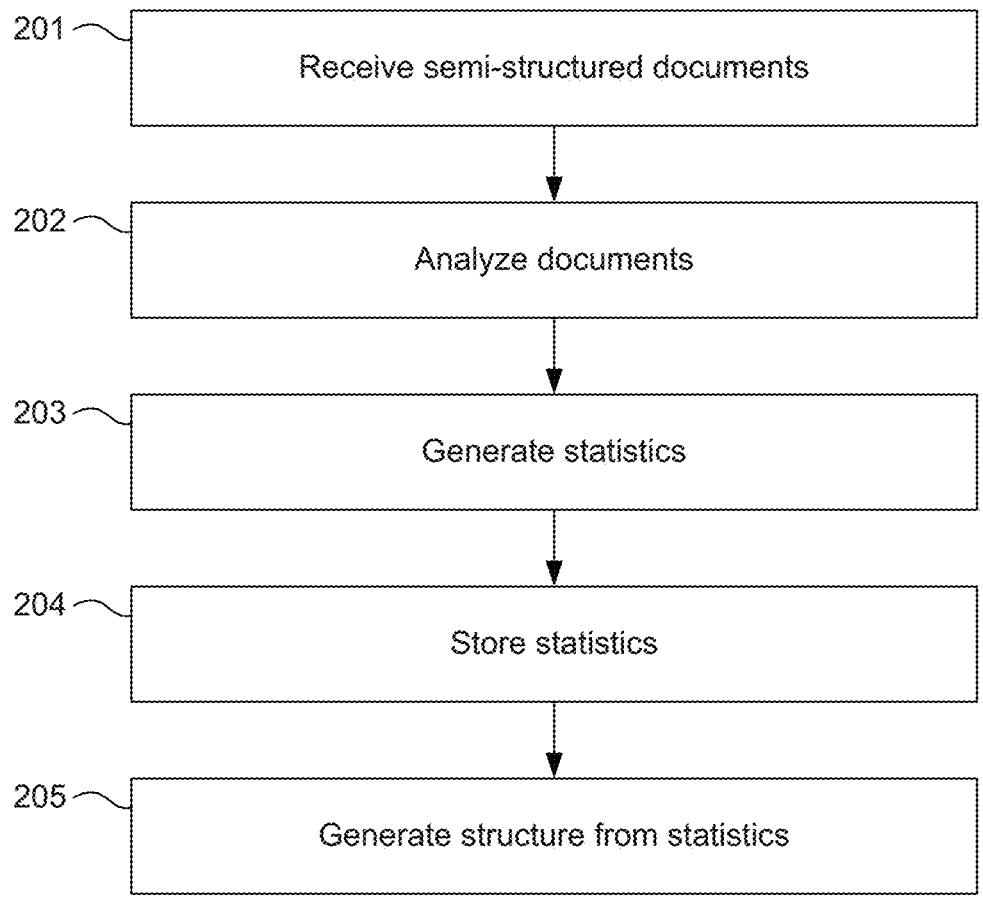
FIG. 2 illustrates a computer implemented method generating structure for semi-structured documents according to one embodiment.

FIG. 2 illustrates a computer implemented method generating structure for semi-structured documents according to one embodiment. Semi-structured documents are received from a data source at 201. As mentioned above, the data source may be a MongoDB or other unnormalized data source, for example. The received documents may include all the documents from the data source or specified subsets of the documents in the data source. In one embodiment, the received documents are a sample of the documents in the data source, which may be selected for multiple sampling strategies/algorithms, for example. The semi-structured documents may include fields having associated values. In various example cases, the semi-structured documents may have varying structure. Some documents may have the same fields. Other documents may have completely different fields. Yet other documents may have overlapping fields, which include one or multiple fields that are the same as other documents in the corpus and other fields that may be only be shared by one or more other document, for example. In some cases, the fields and associated data values may form field-data pairs having a field name and a data value.

At 202 the received semi-structured documents are analyzed to determine particular fields in each of the plurality of semi-structured documents. As described in examples above, the documents may be analyzed to determine what fields are in each document, and from that statistics may be applied to generate information representing the structure of the documents in the data store (e.g., a superset structure). Accordingly, statistics are generated at 203. Example information that may be determined from the received documents includes, but is not limited to, a frequency that each particular field appears in the plurality of semi-structured documents, data types, unique values for the data types, and maximum and minimum values (e.g., for collections).

As mentioned above, in some cases a field of a document may be a collection. For example, a field may be a set of numbers, one or more other semi-structured documents (i.e., sub-documents). Sub-documents may be embedded in a field of a parent document, or a field in a parent document may include one or more references to the other semi-structured documents. Processing collections is a particularly challenging computational problem because parent documents having numerous embedded sub-documents, for example, may only exacerbate the problem of deriving a concise representation of the document corpus structure. For example, if a field includes thousands or tens of thousands of sub-documents in a collection, the computer must have an efficient way of analyzing and representing the collection to a user. In one embodiment, when a field comprising a collection is processed, the computer system may receive the other semi-structured documents in the field, analyze the other semi-structured documents to determine particular fields in each of the other semi-structured documents, apply statistics such as determining a frequency that each particular field appears in the other semi-structured documents, and store the statistics in computer memory (e.g., the particular fields and associated frequencies). The process can be repeated for sub-documents having fields with further collections, for example. In one embodiment described in more detail below, similarities between sub-documents may be calculated to collapse sub-documents into a common structural representation, such as a single node in a tree, for example.

At 204, the information representing the structure of the semi-structured documents (e.g., statistics including frequency, data types, unique values, and/or min/max values) may be stored in one or more computer memories, such as RAM, flash, a hard drive, or the like, for example. At 205, structure may be generated from the statistics. For example, information derived from an analysis of the documents may be used to generate a tree structure representing the structure of the documents in the data source, which may be stored in memory and accessed to create visualizations that may be presented to a user as described in more detail below.

Manipulating Semi-Structured Data

Embodiments of the present disclosure include storing information representing structure of semi-structured documents in a computer memory and presenting the information to a user. A user may view a visualization of the structure and configure the computer system to output portions of the semi-structured data in the data store by interacting with the visualization as described here.

Figure 3:
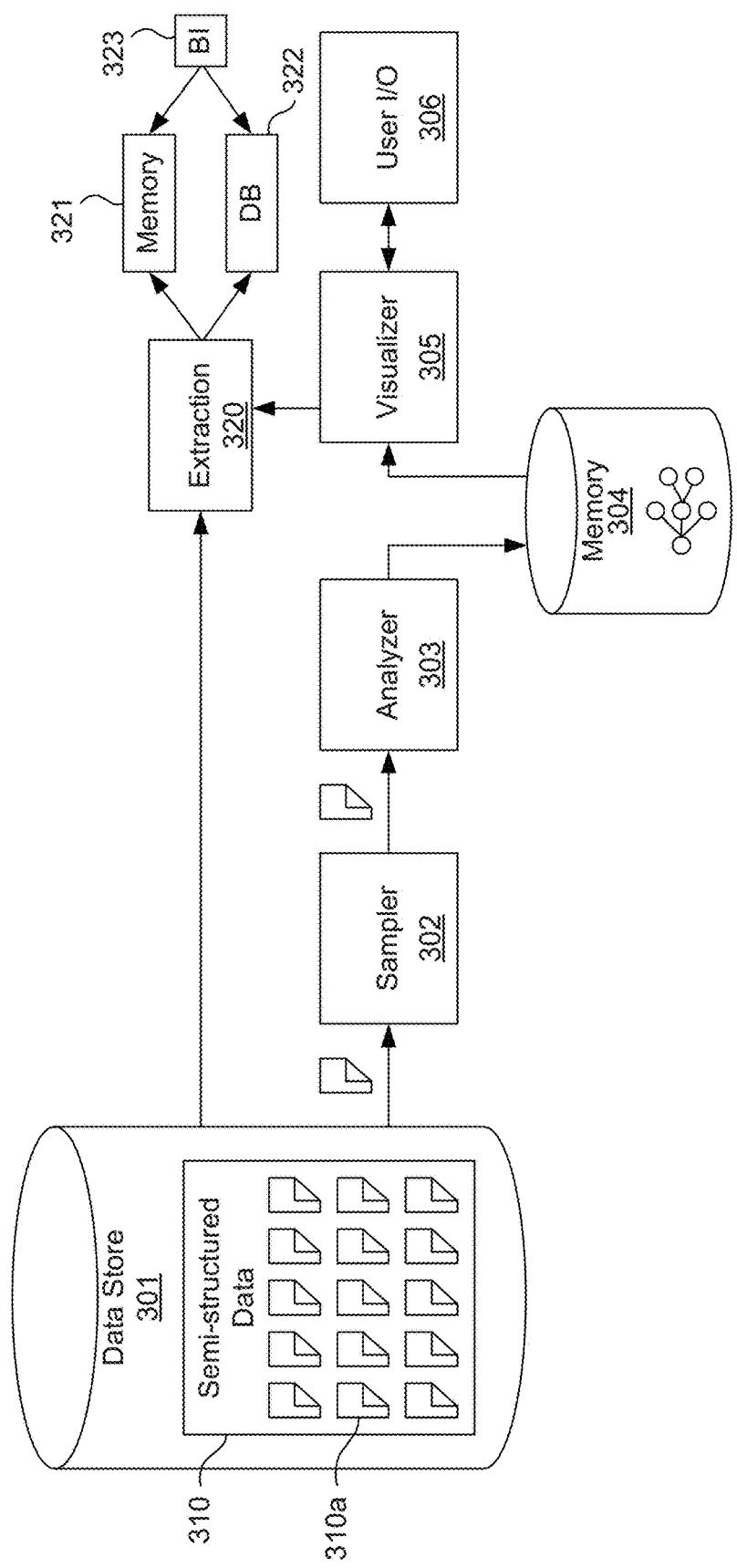
FIG. 3 illustrates computer implemented processing of semi-structured documents according to another embodiment.

FIG. 3 illustrates computer implemented processing of semi-structured documents according to another embodiment. Data store 301 may include semi-structured data 310 including semi-structured documents 310a. A sampler 302 may retrieve all or a subset of the documents and analyzer 303 may generate information about the structure of the documents as described above, for example. Analyzer 303 may generate information representing structure of the semi-structured documents for storage in memory 304. In one example embodiment, the derived structure for the corpus of documents may be represented as a tree data structure, for example, where nodes of the tree represent fields and leaf nodes represent particular values. The following is example metadata in Java Script Object Notation (JSON) describing one example data structure for storing a generated structure:

```
{"structure":
    {"name":"customers12",
    "qualifiedName":"",
    "_stats":
        {"Count":1000,
        "DescendantCount":0,
        "DescendantDepth":5,
        "IsList":false,
        "IsSubDoc":true,
        "IsNumeric":false,
        "IsDate":false,
        "IsValue":false,
        "Level":0,
        "MaxChildSize":10,
        "MinChildSize":8,
        "NullCount":0,
        "ValueCount":1000,
        "ParentCount":1000,
        "ArrayDescendant":false,
        "ListOfValues":false,
        "ListOfSubDocs":false,
```

```
        "ListOfLists":false},
    "Types":
        {"type1":
            {"name":"BasicDBObject","Count":1000}},
    "FieldDistribution":[
        {"FieldCount":9,"Occurences":609},
        {"FieldCount":10,"Occurences":332},
        {"FieldCount":8,"Occurences":59}],
    "children":[
        {
        "name":"address",
        "qualifiedName":"address",
        "_stats":
            {"Count":1000,
            "DescendantCount":0,
            "DescendantDepth":1,
            "IsList":false,
            "IsSubDoc":true,
            "IsNumeric":false,
            "IsDate":false,
            "IsValue":false,
            "Level":1,
            "MaxChildSize":2,
            "MinChildSize":2,
            "NullCount":0,
            "ValueCount":1000,
            "ParentCount":1000,
            "ArrayDescendant":false,
            "ListOfValues":false,
            "ListOfSubDocs":false,
            "ListOfLists":false},
        "Types":{"type1":{"name":"BasicDBObject","Count":1000}},
        "FieldDistribution":[{"FieldCount":2,"Occurences":1000}],
        "children":[
            {
            "name":"city",
            "qualifiedName":"address.city",
            "_stats":
                {"Count":1000,
                "DescendantCount":0,
                "DescendantDepth":0,
                "IsList":false,
                "IsSubDoc":false,
                "IsNumeric":false,
                "IsDate":false,
                "IsValue":true,
                "Level":2,
                "MaxChildSize":0,
                "MinChildSize":0,
                "NullCount":0,
                "ValueCount":1000,
                "ParentCount":1000,
                "ArrayDescendant":false,
                "ListOfValues":false,
                "ListOfSubDocs":false,
                "ListOfLists":false},
            "Types":{"type1":{"name":"String","Count":1000}},
            "FieldDistribution":[ ]
            },
            {"name":"state",
            "qualifiedName":"address.state",
            "_stats":
                {"Count":1000,
```

Visualizer 305 may access the information representing structure of the semi-structured documents from memory 304 and generate a visual representation of the document's structure. The visual representation may include graphical elements corresponding to the plurality of fields. In the case of a tree data structure, the visual representation is a graphical tree. Visualizer 305 may output the visual representation to a user interface 306, such as a display, for example. As described in more detail below, a user may view the visual representation of the documents' structure and perform a variety of operations to either refine the visualization or produce an output data set. In some embodiments, visualizer 305 may be deployed in a web server for generating a user interface and may include code for flattening and extracting data dynamically in response to user inputs to show the user a preview of an output data set. In some embodiments, when a user has specify particular nodes to include in an output data set, configuration parameters may be sent to an extraction engine 320 residing on a server for performing the data flattening and extraction to memory 321 or structured database 322 for use with Business Intelligence (BI) tools 323, for example.

Features and advantages of the present disclosure include receiving input from a user to specify fields in a semi-structured data set for extraction, and outputting the specified fields in an output data set as a two-dimensional data structure (e.g., a table). Interacting with the visual representation may include specifying fields to include in the output data set by selecting particular nodes in a tree that represent fields and specifying operations on fields by accessing the nodes in the tree and invoking menus, for example. As described in examples below, menus for particular nodes may include a variety of information about the node and operations that may be performed on the particular node (e.g., based on the information about the node). Operations may include filtering, aggregation, or flattening of collections, for example, where a collection is a plurality of items in a single field (e.g., a field with a set of numbers or multiple subdocuments).

Embodiments of the present disclosure may allow business intelligence (BI) tools to work with semi-structured data. For example, data in a relational database is typically stored in a normalized form. In order for BI tools to work with the data it is transformed into a set of denormalized records. Similarly, in order for BI tools to work with data from a semi-structured document store the documents need to be flattened to a set of denormalized records. As mentioned above, documents in a collection may comprise a set of name/value pairs. The value for a name can be an atomic value (ex. a number), a collection of values, or another document. The name is referred to as a field.

A user may be presented with a visual representation of the structure of the documents. The user may then interactively choose which part of the documents should be transformed to the denormalized or normalized records. As the user specifies particular fields and operations, the data is flattened into a two-dimensional data structure, such as a table, and a dynamic view of the flattened data may be updated to give the user feedback on the results of their choices.

Figure 4:
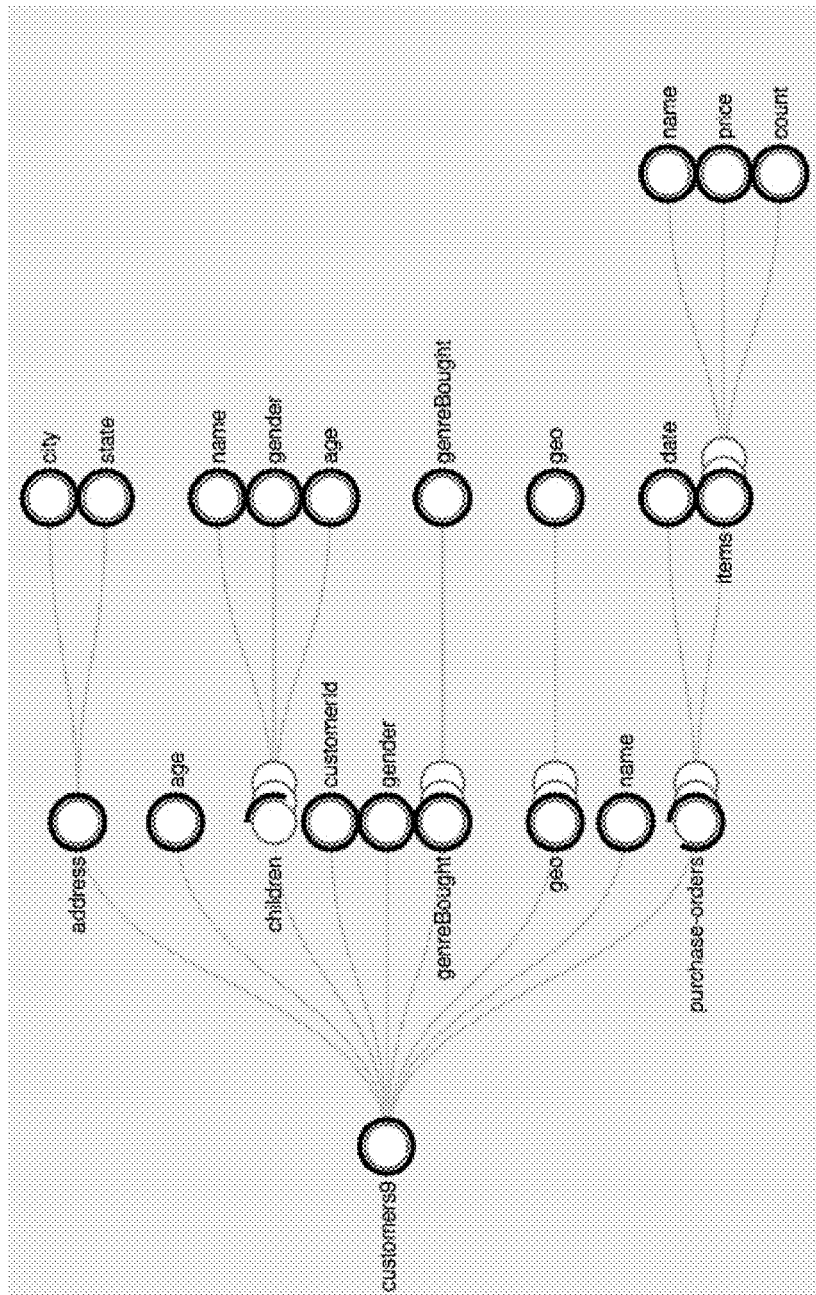
FIG. 4 illustrates an example of a document structure derived from a semi-structured document corpus and presented as tree according to one embodiment.

FIG. 4 illustrates an example of a document structure derived from a semi-structured document corpus and presented as tree. Nodes correspond to individual fields. Leaf nodes are fields with atomic values. Nodes with child nodes represent fields whose values are documents, and nodes shown as multiple circles are fields whose values are a collection. Representing collections as multiple circles is just one example of how graphical elements corresponding to collections may be different than graphical elements that do not correspond to collections in the visual representation, for example. It is to be understood that alternate visual representations of the structure could also be used.

Figures 5, 6:
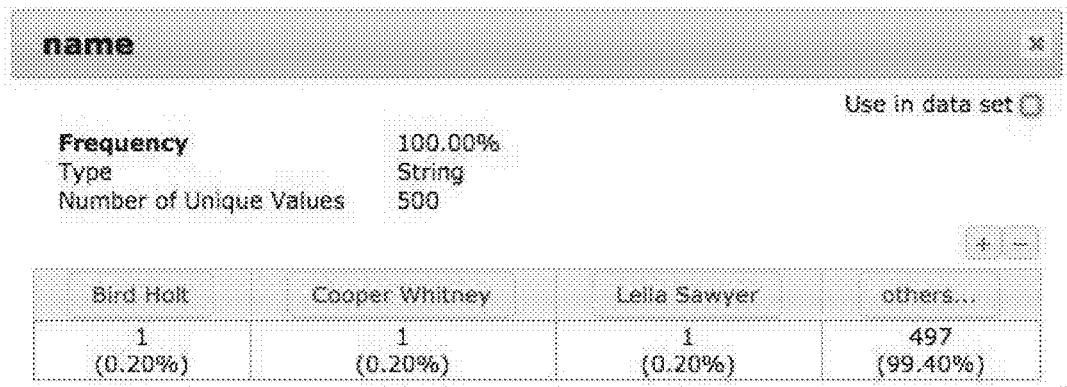
FIG. 5 illustrates an interface for an example node according to one embodiment.
FIG. 6 shows a preview of an output data set according to one embodiment.

A user may select a particular node to receive information about the different fields. For example, a user may hover over a node or click on a node. When the computer system receives information representing a user selection of a node in the tree, for example, the computer may generate an interface for displaying and receiving information, such as a pop-up dialog. FIG. 5 illustrates an interface for an example node. In this example, the "Name" field has been selected in the tree. An interface displays the frequency with which the field appears in the different documents in the document store, the type (here, "String"), number of unique values etc. The user can select this as a field to include in the output data set.

Selecting fields which only occur once in a document will result in a flattened data set where each record corresponds to one document from the document corpus in the data store. The computer system may generate a table of selected data based on the fields specified for inclusion in the output data set by a user. The user may be shown a preview of the flattened data, for example. FIG. 6 shows a preview resulting from a user choosing the 'name' and 'age' fields for inclusion in the output data set, as well as the 'city' field of the 'address' sub-document.

One technical problem with processing semi-structured document pertains to flattening collections. Collections are field values that comprise multiple items, such as a set of numbers or multiple subdocuments. When dealing with fields that are a collection decisions may be made about the denormalization/flattening process. For a collection field, for example, a user may be given the option of expanding the values in the collection into multiple rows (i.e. records) or multiple columns. FIG. 7 illustrates an example of a 'geo' collection comprising an array of integers, where the array always has two elements. FIGS. 8-9 illustrate two example methods of flattening a collection. In one embodiment, flattening may comprises, in response to a first user selection, incorporating the plurality of items in the collection as columns in the two-dimensional data structure, and alternatively, in response to a second user selection, incorporating the plurality of items in the collection as rows in the two-dimensional data structure. For example In this example, choosing to expand children as multiple columns causes a column for each element of the collection, up to the maximum size of the collection, to be added to each record. The maximum size of the collection may be determined by examining the documents in the document data store. Choosing to expand children as multiple rows (i.e. records) will result in denormalization of the data. Instead of a record for each document, the output data set will contain a record for each element in the collection. The data in the original record will be duplicated in each new record. FIGS. 8 and 9 show the results of adding the 'geo' value field to the dataset with the 'geo' collection expanded as multiple columns and multiple rows.

Figures 10, 11:
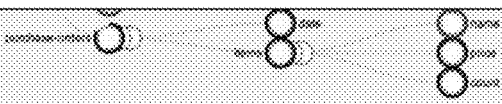
FIG. 10 shows an example output according to one embodiment.
FIG. 11 shows an example output for collections expanded to multiple records according to one embodiment.

Collections in semi-structured documents are particularly difficult to process with a computer when the collections are nested. When handling the case of nested collections by expanding to multiple columns, the number of columns increases geometrically. The number of columns created will be the product of the maximum sizes of the outer and inner collections. FIG. 10 shows the sample output when the field "purchase-orders.items.name" is added to the output. The field "purchase-orders" has a maximum size of five and "purchase-orders.items" has a maximum size of six, resulting in thirty columns being added to the output.

When dealing with nested collections by multiple row expansion, a child collection (e.g., items) may be expanded as multiple rows if its ancestor collection (e.g., purchase-orders) is also expanded as multiple rows, for example. In this case, for each element in the ancestor collection there will be a record for each element in the corresponding child collection. FIG. 11 shows the result of including the date field from the 'purchase-orders' collection and the 'name' field from the nested 'items' collection where both collections are expanded to multiple records.

Figure 12:
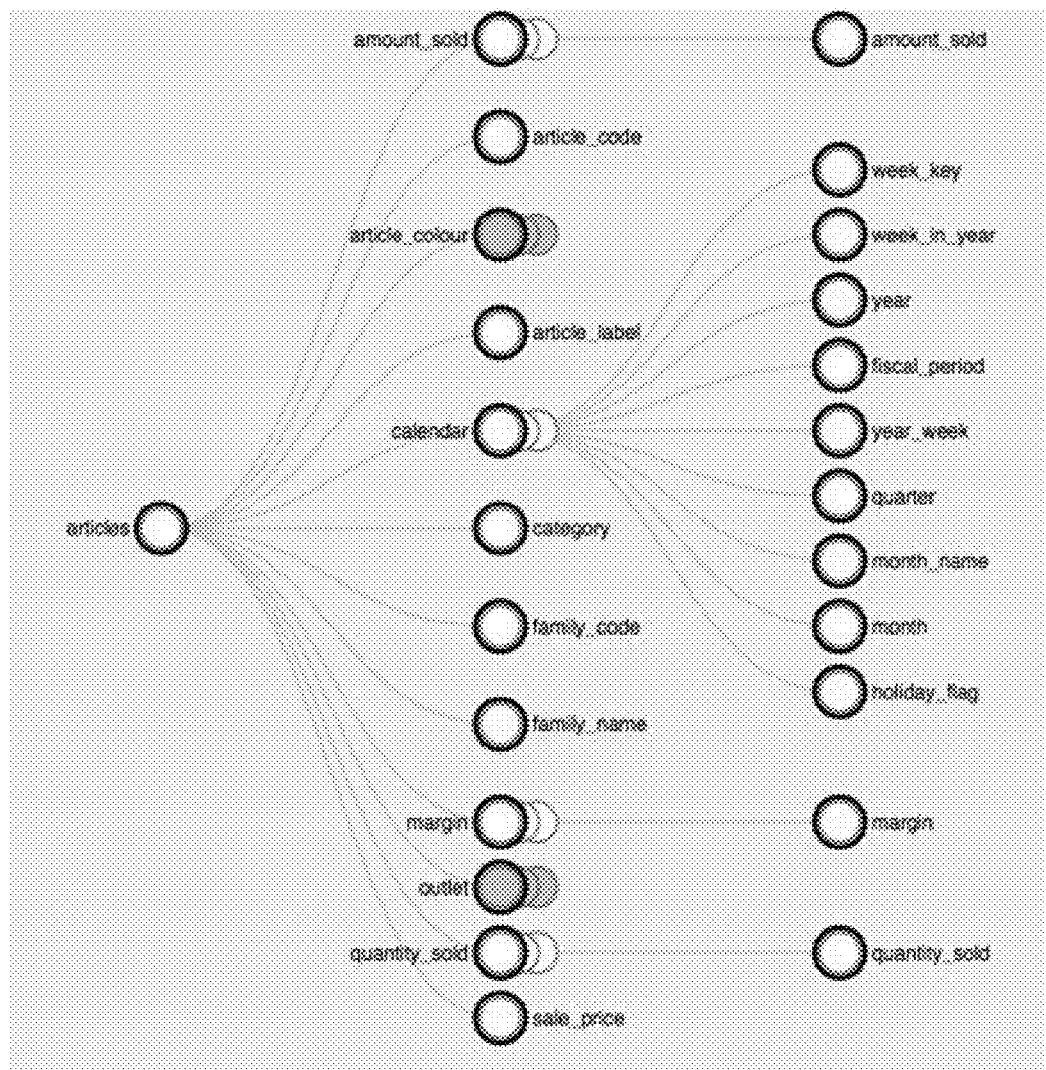
FIG. 12 illustrates an example of linked collections according to an embodiment.

FIG. 12 illustrates an example of linked collections according to an embodiment. The example in FIG. 12 shows structural information for a collection of documents where each document corresponds to a specific article in inventory. Each document contains fields for information describing the article; such as "article_code", "article_label", "category", "family-code", etc. Each document in this example also contains information about sales of the article. For each sale there is information such as the amount sold, the date and time of the sale, the location of the sale, etc. Instead of having a collection of sub-documents where each sub-document corresponds to a sale. The data has been organized with separate linked collections for different pieces of information about the sale. In this example, the collections include "amount-sold", "quantity_sold", and "margin" collections containing values for each sale. There is a "calendar" collection which contains information about the date/time of each sale. There is also an "outlet" collection which contains the location information for each sale.

In any individual document the linked collections may have the same number of elements. Furthermore, the nth element in any collection corresponds the nth element in the other collections. In this example, to get complete information about a sale you need to look at the corresponding elements in all the linked collections. However, linked collections cannot always be inferred from the structure of the data. In these cases, the computer system may receive further information (e.g., from a user) to indicate which collections are linked. When filtering the data, the computer system may have special handling processes for linked collections. Normally if data is filtered on a value in a collection, the system would simply remove all the elements from the collection that didn't pass the filter. For linked collections, the system may maintain the consistency between the collections. Thus, removing an element from one collection means the system may remove the corresponding element from the other linked collections. For example, referring to FIG. 12, a filter on the "year" child field of the "calendar" collection may cause filtering of similar elements in other linked collections. In particular, if the "year" value in the 100th element of the calendar collection doesn't pass the filter, the system may remove the 100th element from the calendar collection and also remove the 100th element from the other linked collections to maintain the consistency of the information for each sale.

Features and advantages of the present disclosure include representing multiple collections as single collections if the collections are sufficiently similar. For example, in one embodiment, a computer system may determine a similarity between particular items in a particular collection and collapse items in the collection into a single graphical element in a visual representation, for example, when the similarity between items is greater than a threshold. Accordingly, similar sub-structures may be collapsed into a single representational sub-structure. Embodiments may include collapsing in both the tree structure in memory and the visualization in the interface to simplify the user interface design.

Figure 13:
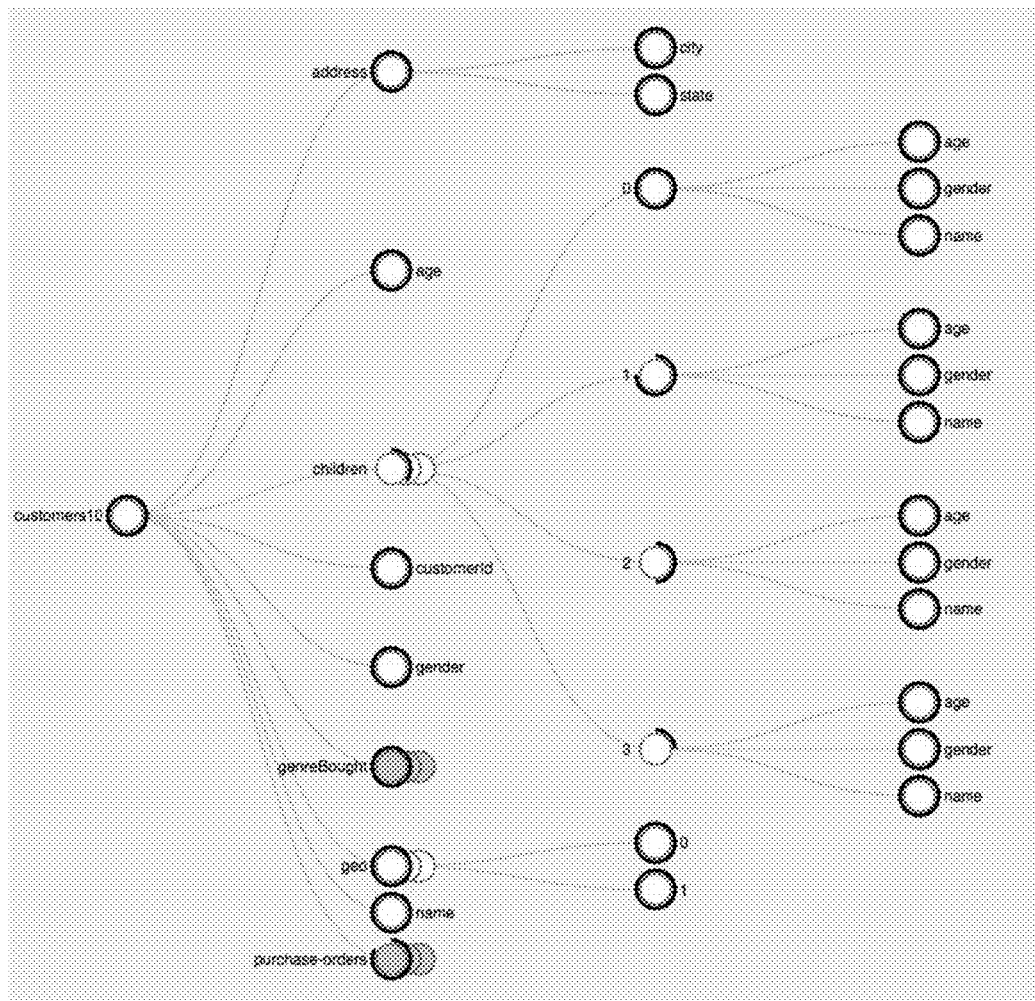
FIG. 13 illustrates an example corpus structure where similar collections are collapsed according to an embodiment.
Figure 14:
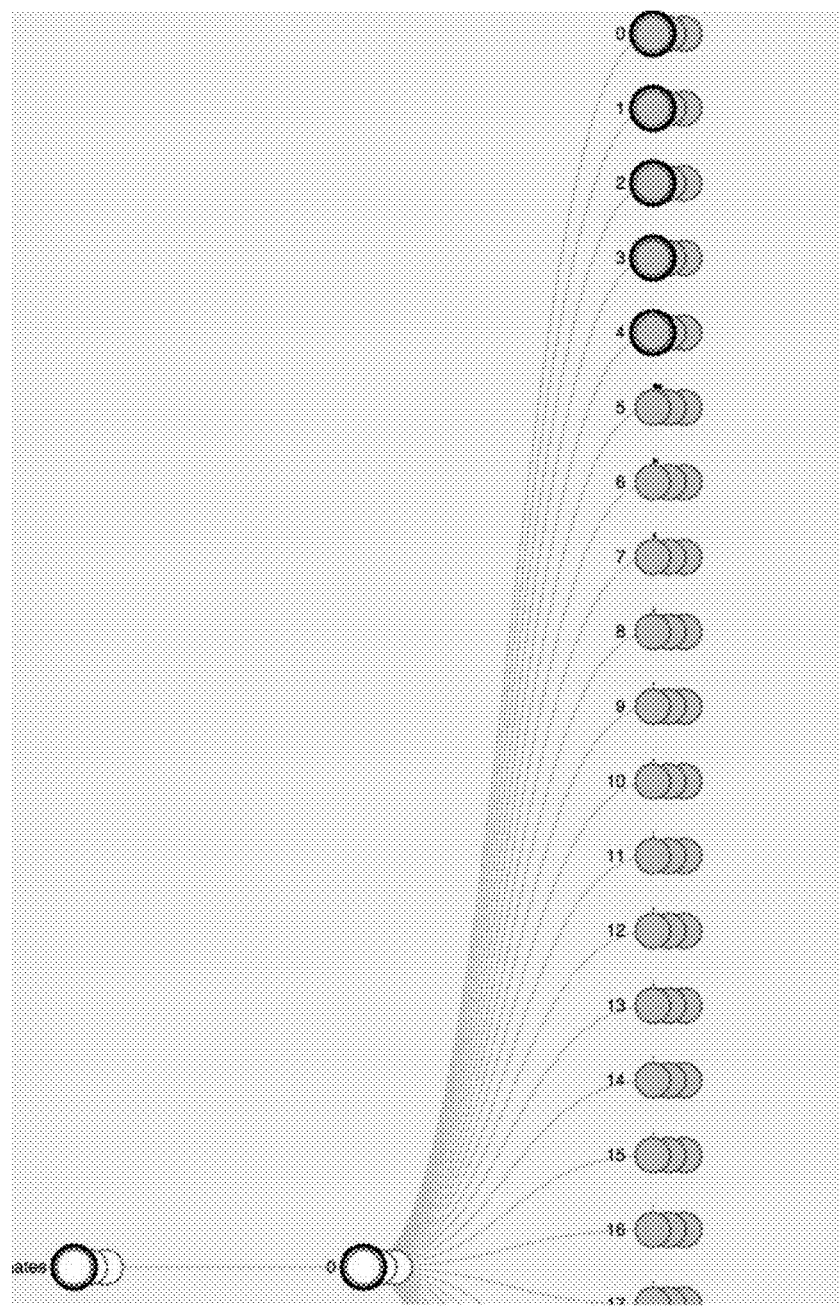
FIG. 14 illustrates an example uncollapsed structure.

FIG. 13 illustrates an example corpus structure where similar collections are collapsed according to an embodiment. In this example, a collection with a document may be presented as a sub-document where the fields are named using contiguous integer values (i.e 0, 1, 2, . . . ). In FIG. 13 the structural representation for the documents in a database called 'customers10'. The "children" node shows that at least some of the documents have a "children" field (e.g., a partial darkened circle indicates about 30% of the documents have a "children" field). The overlaid circles of the "children" node indicate that the "children" field is a collection. The "children" node has child fields named 0, 1, 2, and 3. Each of these child elements has further child fields for "name", "age", and "gender". In this example the maximum number of items in the "children" collection for all the documents in the database is only four. However, it is common to have much larger collections holding thousands or even tens of thousands of items. This quickly results in a visual representation that is very difficult to work with. FIG. 14 illustrates an example structure showing how quickly things can become unwieldy.

To avoid this problem, some embodiments of the present disclosure attempt to collapse the elements (or items) in the collection into a single representational element (e.g., a single graphical element in the graphical tree). The process is similar to the process used to generate a superset of structure information for set of documents. However, one important difference is that collapsing is done when the different elements in the collection have a high enough degree of similarity (e.g., above a threshold).

While it is to be understood that similarity between items in a collection may be determined using a wide variety of techniques suited for a particular application and/or data set, the following is one example technique for calculating similarity presented for illustrative purposes. The sub-documents in the collection are examined to determine the set of all occurring fields. The system may work in an N-dimensional space where N is the number of different fields and each possible field represents a dimension. A vector in the N-space is generated for each collection element, with the presence of a given field corresponding to a value of 1, for example for the corresponding dimension. The vector is then normalized to a unit vector. The system may run a self-learning clustering algorithm using cosine similarity to compare elements and a specified (e.g., by a user) required degree of similarity. The algorithm generates it's own cluster prototype vectors using the similarity criteria. The algorithm runs until there are no perturbations in the clusters or the maximum number of cycles have been reached based on a decay rate for cluster adjustment.

The angle θ between two vectors x and y is calculated using:

$$\cos \theta = (x \cdot y)/(\|x\|\|y\|)$$

Since the vectors are all unit vectors this reduces to:

$$\cos \theta = (x \cdot y)$$

Figure 15:
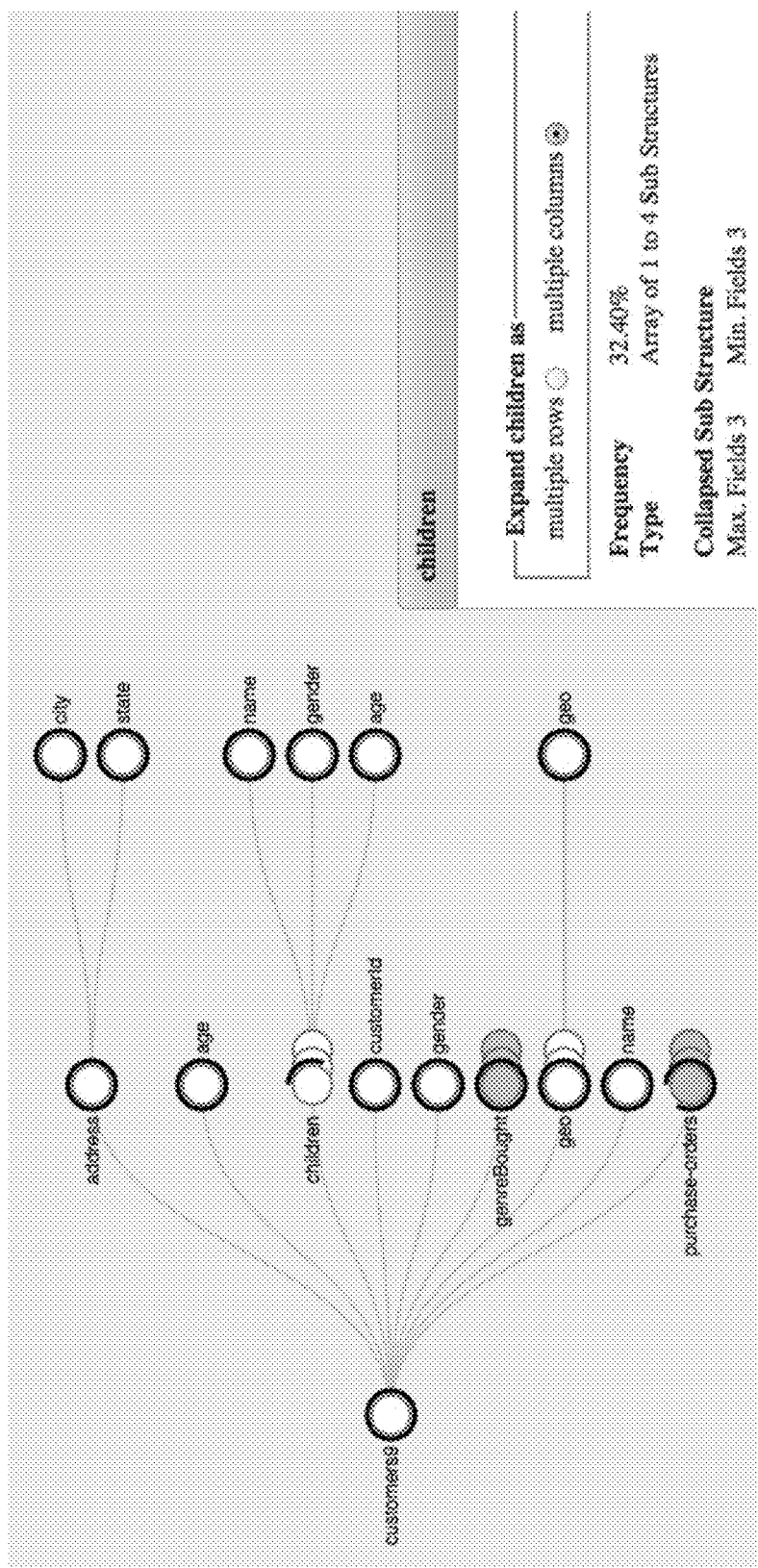
FIG. 15 shows a collapsed node according to one embodiment.

Given N element vectors (e1, e2, . . . en) and M cluster prototype vectors p where 0≤M≤N. For each element ei find the closest existing p. If no p exists or the closest p is not within the given similarity requirement a new p is created where $p_c$=ei. If the closest p($p_c$) is within the similarity requirement then ei is placed in the $p_c$ cluster and $p_c$ is adjusted as follows:

$$p_c = (1.0 - \lambda)p_c + \lambda ei$$

where λ is a positive value <1 which decreases over time. The end result is a set of clusters where all the elements in the cluster are within at least the specified degree of similarity. If there is exactly one cluster, the system collapses the elements to a single representational element. If there is more than one cluster, the system can choose to not collapse or, based on user settings, generate a representational element for each cluster, generate a representational element for the N largest clusters and either include or discard additional elements, etc. FIG. 15 shows the same structure information as in the first screenshot with elements of "children" collapsed. The corner of the information dialog for "children" is visible showing that it contains the information that the "children" field represents a collection of 1 to 4 substructures and indicates the maximum and minimum number of fields contained in the substructure.

Features and advantages of some embodiments may include interactive specification and manipulation of semi-structured data. As mentioned above, some embodiments may include data filtering, for example, or other operations as part of the process of generating an output data set. For example, some embodiments may include analyzing semi-structured documents in a data store and generating structural information about the semi-structured documents, which may use techniques described herein, for example. Structural information may be displayed as a graphical tree comprising nodes and leaf nodes. Particular nodes may be specified (e.g., by a user) to include in an output data set. A wide range of information, structural and otherwise, about the semi-structured documents may be generated to support use and/or extraction or transformation of the data in the data source. For example, in one embodiment, as a user selects particular nodes in a graphical tree, information about the nodes may appear in a menu (or dialog) for the node. More generally, information about different fields may be generated, and as a user specifies filters or other operations on the semi-structured data, the data is updated dynamically and may be previewed to show a user the results of particular selections, for example. In one example embodiment shown below, information in multiple different dialogs corresponding to particular nodes of a graphical tree (and fields in a corpus of documents) may be automatically updated, where a user specified manipulation of one node is propagated to the other dialogs for other nodes in the tree. When the specification process is complete, the specified fields corresponding to the particular nodes from semi-structured documents may be extracted from the documents in the data store and stored in an output data set as a two-dimensional data structure, for example.

Figure 16:
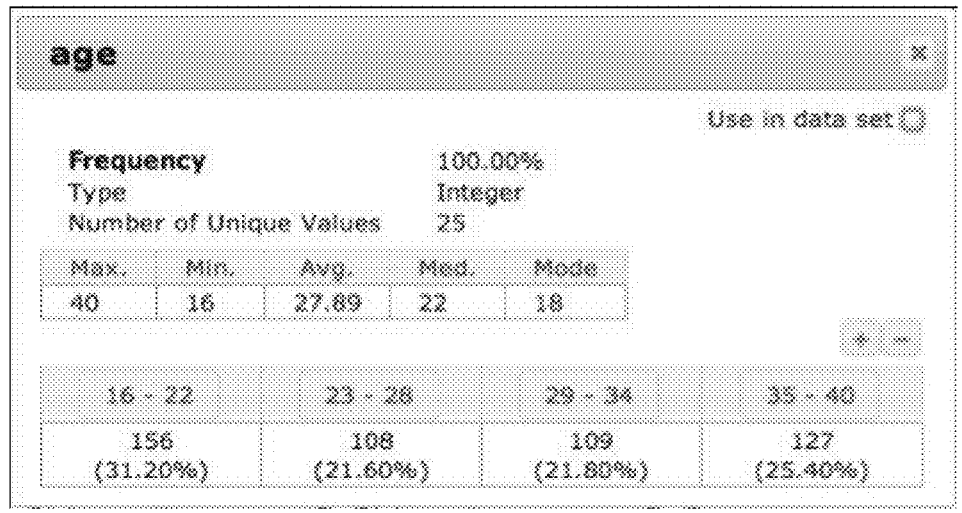
FIG. 16 illustrates statistical information about values according to one embodiment.

As set forth above, particular embodiments may apply statistics to the corpus of semi-structured documents (e.g. frequency, min, max, etc.). In addition to statistics about the values (i.e. max, min, etc.) of fields, pop-up dialogs for value fields may also include a set of buckets showing a distribution of values as illustrated in FIG. 16. In FIG. 16, the number of buckets can be increased/decreased by clicking the plus and minus buttons at the top right corner. Clicking on the heading for a bucket will apply a filter to the sampled data. For example, clicking on the '16-22' bucket in the age dialog (shown in FIG. 16) may filter the data to only show data from documents where the age value is in this range. Clicking on multiple buckets may create an OR condition (e.g., age is 16 to 22 OR age is 35 to 40). When filters are applied all the displayed statistics may be modified based on the filtered subset of the sample data. Accordingly, for example, if the user has the age and gender dialogs open they could watch the age distribution change when filtering to just men. Detailed examples of dynamic updating are shown below.

Filtering on a child field of an array may cause that sub-document instance to be removed from the array, for example. Accordingly, filtering on "children.age" (See FIG. 4) may remove any sub-documents that don't match the filter, but may only remove top level documents that subsequently contain no children.

Figure 17:
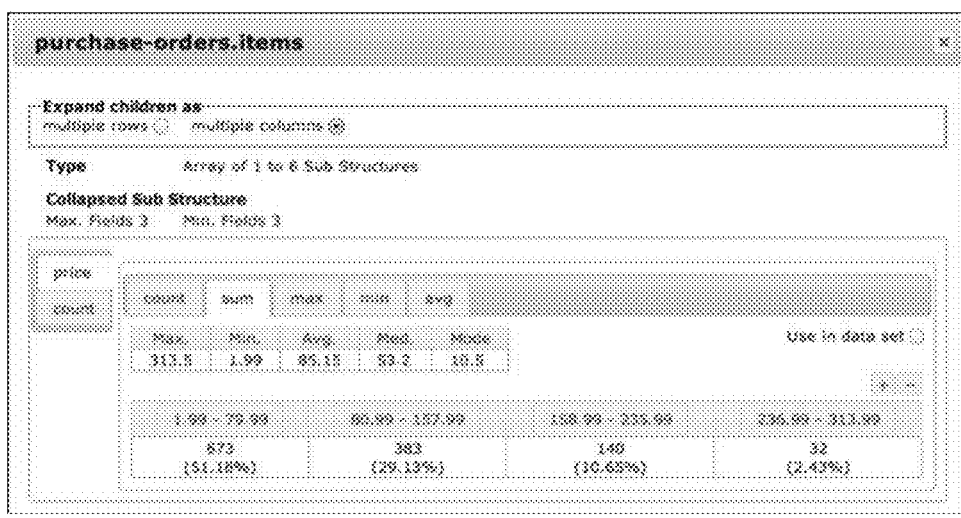
FIG. 17 illustrates aggregates according to one embodiment.

Another operation incorporated into the system may include aggregating data. Aggregates (e.g., count, sum, maximum, minimum, and average) may be calculated for numeric values that are children of collections, for example. FIG. 17 shows a dialog for the "purchase-orders.items" array with the sum of the price field shown. A data dialog for an array may include tabs for each numeric child field (here, "price" and "count", See FIG. 4), and within each field tab are tabs for the different aggregates. As with other values, statistics about the sum of "price" (e.g., Max, Min, etc.), as well as buckets for the distribution of the sum of "price" (bucket 1.99-79.99, etc.), are shown. The buckets can be used to filter the sampled data and the stats/distribution may be dynamically updated when any filters change. Aggregate values displayed are based on a level of denormalization. For example, if each record corresponds to a document including the sum of "price", the result is a value in each record which is the sum of "price" for all "items" elements for all 'purchase-orders' elements in the document. However, if the data has been denormalized so that each record corresponds to a "purchase-orders" element then the sum value in each record will be the sum of "price" for all "items" elements in that "purchase-orders" element.

Figure 18:
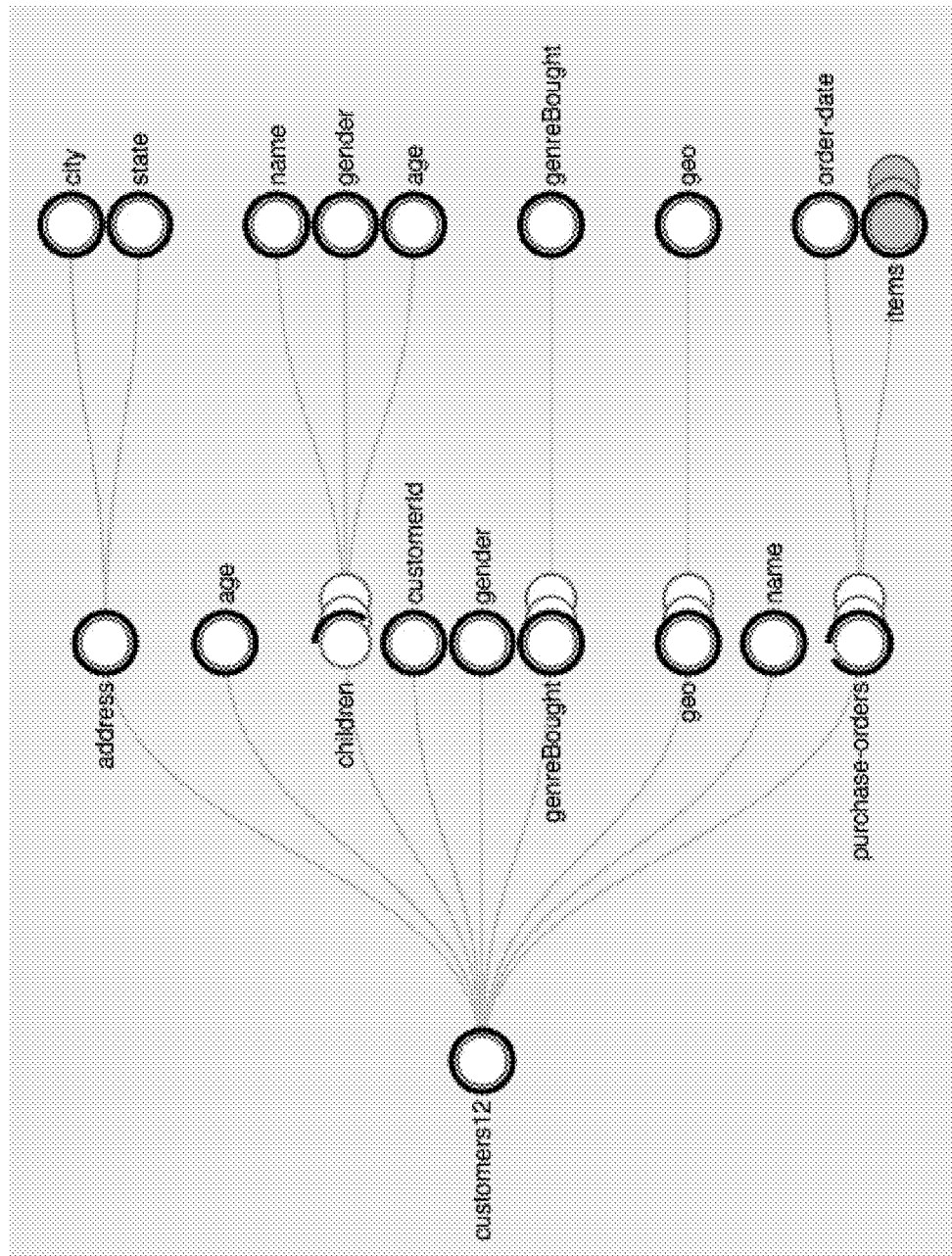
FIG. 18 illustrates structural information for a collection of customer documents according to an example embodiment.
Figure 19:
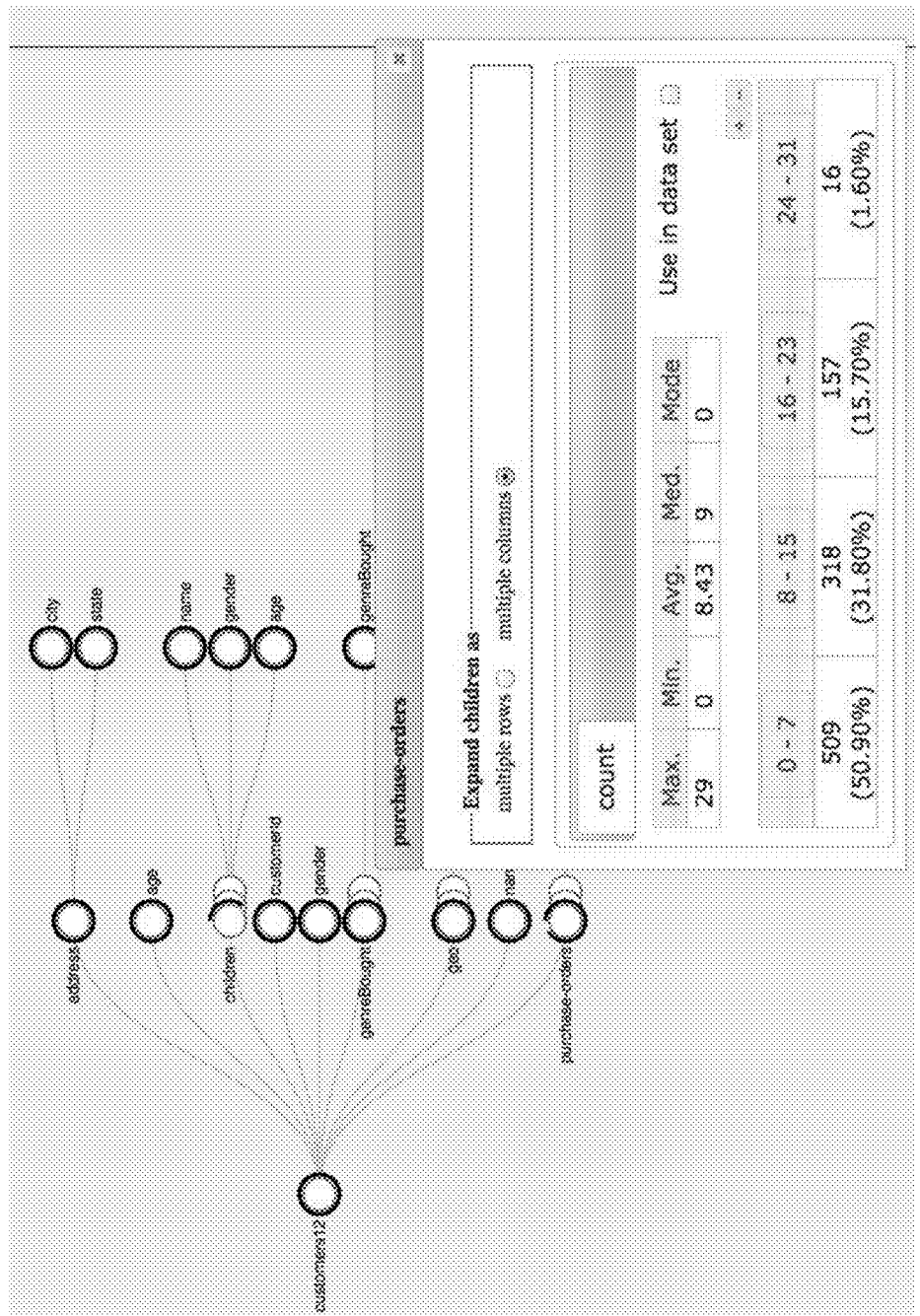
FIG. 19 shows an information dialog with further information is generated for a collection according to one embodiment.
Figure 20:
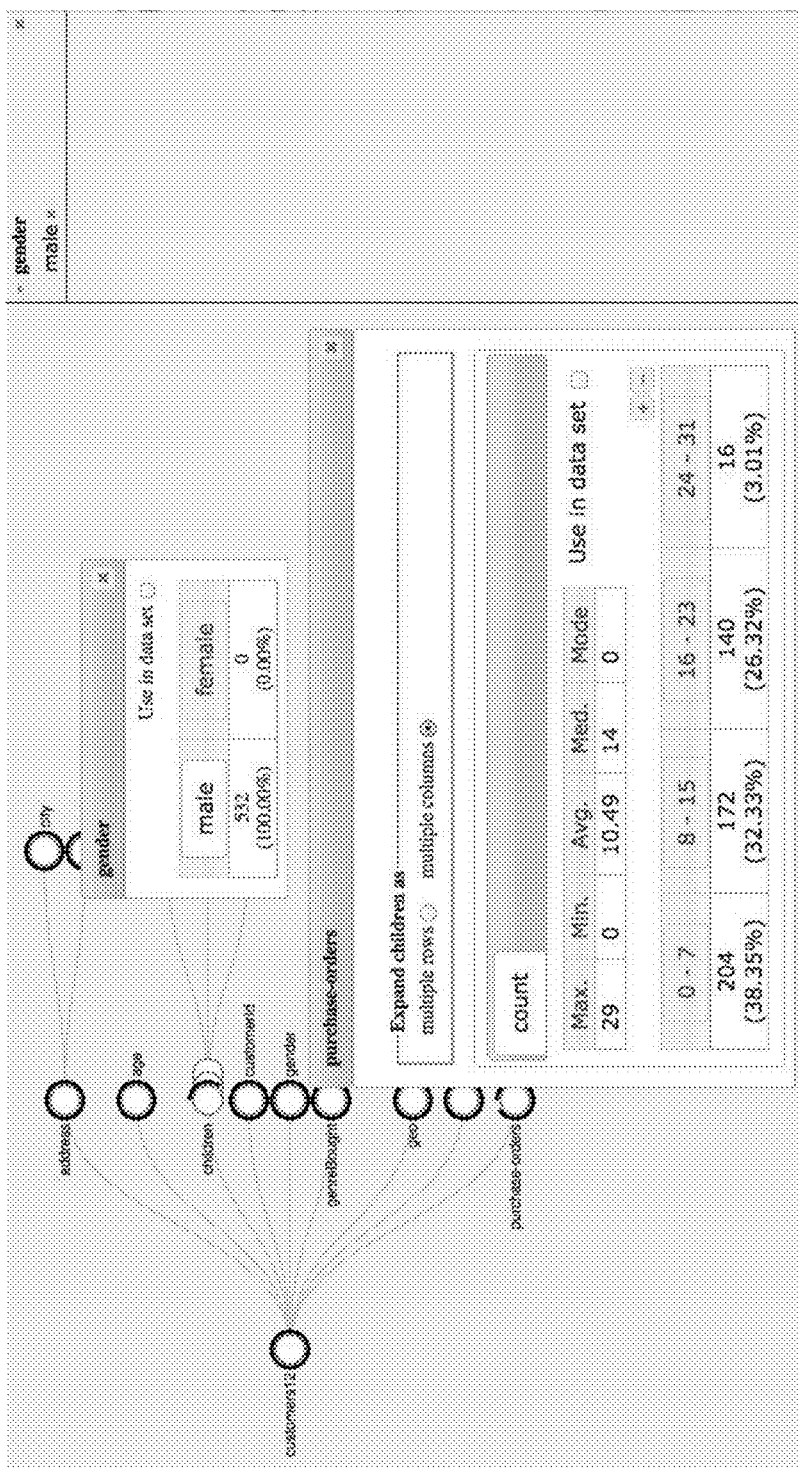
FIG. 20 shows an example of dynamic update of information when filters are applied according to one embodiment.

As discussed above, information about values for fields may be generated and updated dynamically. For example, in one embodiment, statistical information may be generated about values for a first plurality of fields. Filters may be applied particular fields through the visual representation. The system may automatically update the statistical information about values for other fields based on the filter. For example, FIG. 18 illustrates structural information for a collection of customer documents according to an example embodiment. In some applications, it may be desirable to do an analysis on factors that affect how many purchases customers make, for example. In FIG. 19, an information dialog with further information is generated for the "purchase-orders" collection. This shows information about purchase-orders. The count is the number of purchase-orders in the collection, and the dialog shows that the average customer makes 8.43 purchases. The maximum number of purchases by a customer is 29 and the minimum is zero. FIG. 20 shows an example of dynamic update of information when filters are applied. Pulling up the information dialog for "gender" node, the system can filter the data by selecting either the male or female value. FIG. 20 shows that filtering for male causes an automatic update in the information for "purchase-orders", where an average number of purchases is now 10.49 (i.e., for males).

Figure 21:
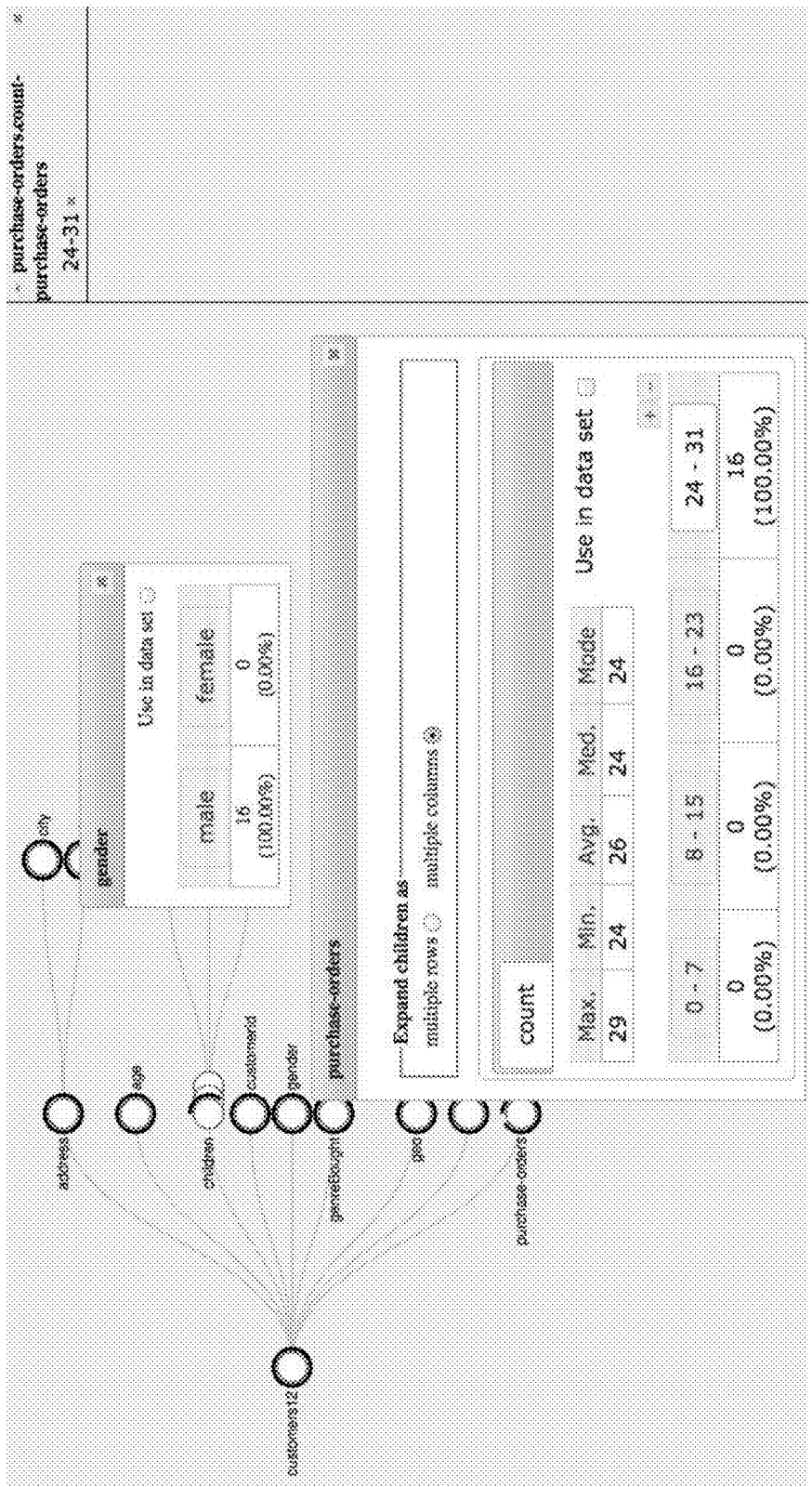
FIG. 21 shows another example of dynamic update of information when filters are applied according to one embodiment.

Alternatively, the system may be configured to filter on the number of purchases as illustrated in FIG. 21. Filtering for number of purchases may be applied by specifying the 24 to 31 range. When this range is specified, the information for both "gender" and "purchase-orders" is updated to show that in the sample data there are 16 males and no females with this many purchases.

Figure 22:
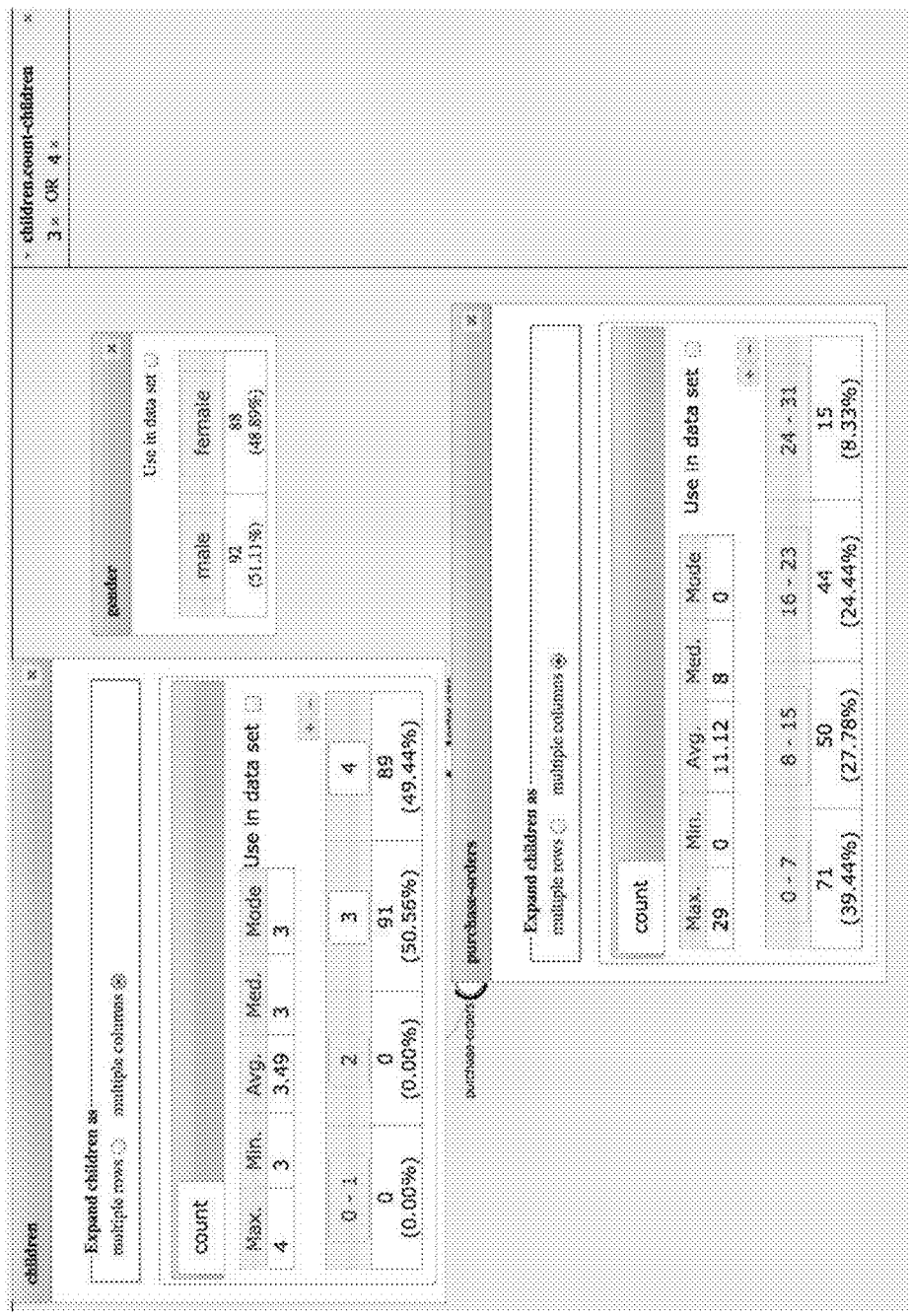
FIG. 22 shows yet another example of dynamic update of information when filters are applied according to one embodiment.
Figure 23:
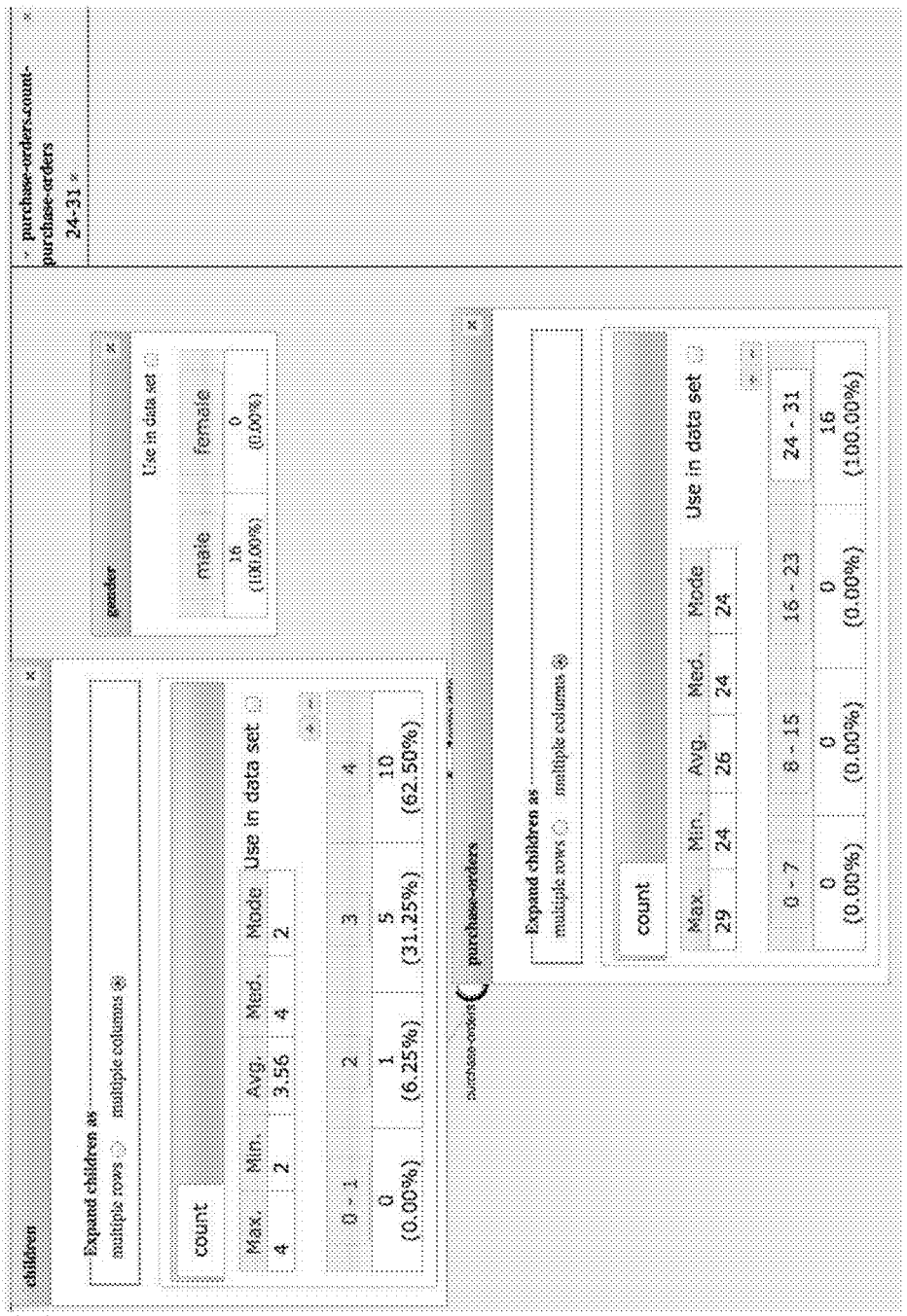
FIG. 23 shows yet another example of dynamic update of information when filters are applied according to one embodiment.

FIG. 22 illustrates invoking the information dialog for the "children" collection. The "children" dialog provides the user with information about the count of "children" for each customer. A user may apply a filter by number of children and see how it changes the distribution of the number of purchases and gender. As illustrated in FIG. 22, applying a filter for customers with 3 or 4 children has minimal effect on the male/female ratio of customers, but that it does skew the distribution of the number of purchases into the 8 to 15 and 16 to 23 ranges. However, as illustrated in FIG. 23, a user may specify a filter by number of purchases and see how selecting for larger number of purchases skews the child count towards higher numbers of children. This ad-hoc analysis of the sample data is showing that age, gender, and number of children have strong effects on the number of purchases.

Example Hardware

Figure 24:
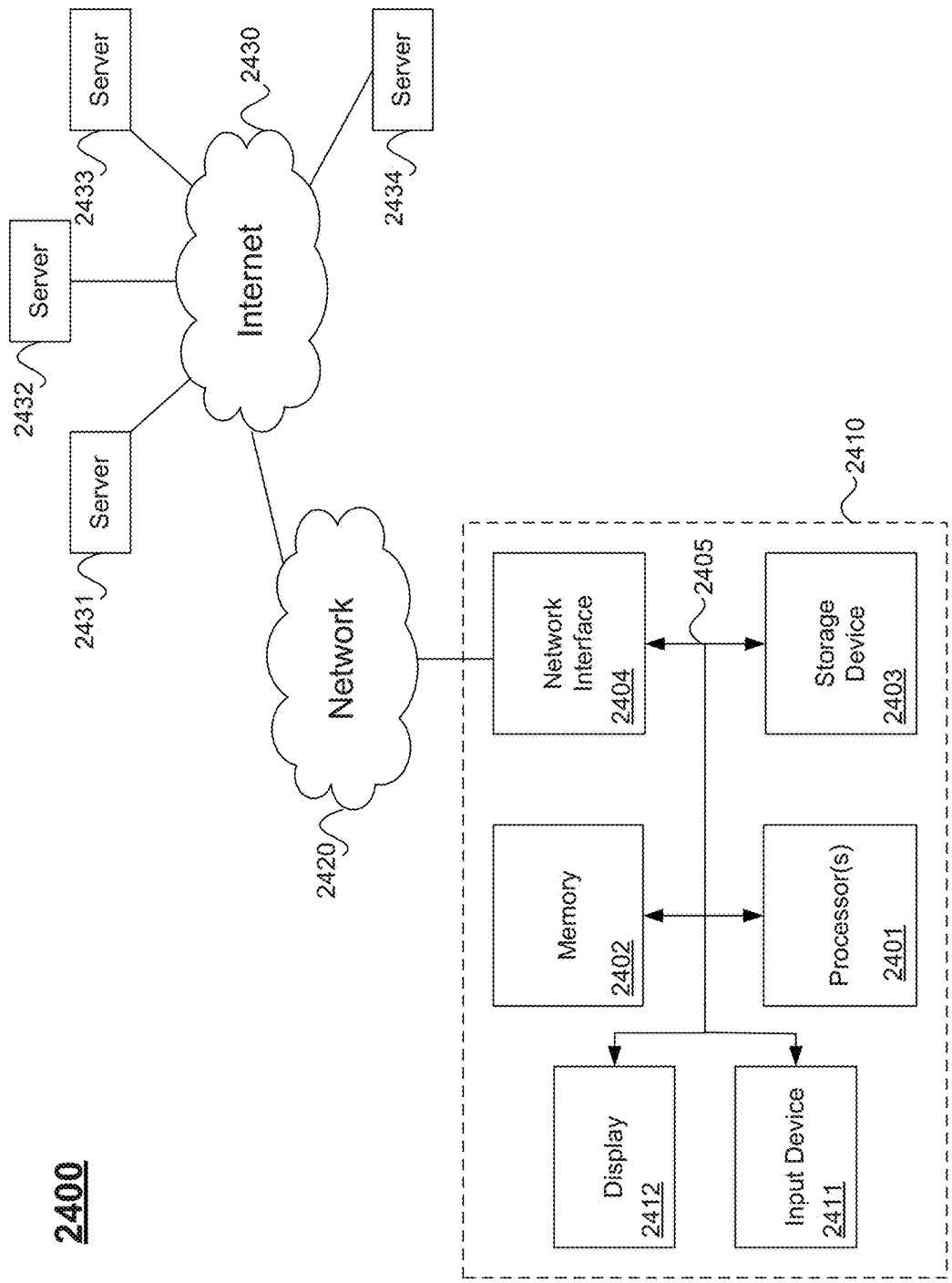
FIG. 24 illustrates hardware of a special purpose computing machine configured with a process according to the above disclosure.

FIG. 24 illustrates hardware of a special purpose computing machine configured with a process according to the above disclosure. The following hardware description is merely one example. It is to be understood that a variety of computers topologies may be used to implement the above described techniques. An example computer system 2410 is illustrated in FIG. 24. Computer system 2410 includes a bus 2405 or other communication mechanism for communicating information, and one or more processor(s) 2401 coupled with bus 2405 for processing information. Computer system 2410 also includes a memory 2402 coupled to bus 2405 for storing information and instructions to be executed by processor 2401, including information and instructions for performing some of the techniques described above, for example. This memory may also be used for storing programs executed by processor(s) 2401. Possible implementations of this memory may be, but are not limited to, random access memory (RAM), read only memory (ROM), or both. A storage device 2403 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 2403 may include source code, binary code, or software files for performing the techniques above, for example. Storage device and memory are both examples of non-transitory computer readable storage mediums.

Computer system 2410 may be coupled via bus 2405 to a display 2412 for displaying information to a computer user. An input device 2411 such as a keyboard, touchscreen, and/or mouse is coupled to bus 2405 for communicating information and command selections from the user to processor 2401. The combination of these components allows the user to communicate with the system. In some systems, bus 2405 represents multiple specialized buses, for example.

Computer system 2410 also includes a network interface 2404 coupled with bus 2405. Network interface 2404 may provide two-way data communication between computer system 2410 and a network 2420. The network interface 2404 may be a wireless or wired connection, for example. Computer system 2410 can send and receive information through the network interface 2404 across a local area network, an Intranet, a cellular network, or the Internet, for example. In the Internet example, a browser, for example, may access data and features on backend systems that may reside on multiple different hardware servers 2431-2434 across the network. Hardware servers 2431-2434 and server software may also reside in a cloud computing environment, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
accessing, from a computer memory, information representing structure of a plurality of semi-structured documents, wherein the plurality of semi-structured documents comprise a plurality of fields having associated values;
generating, by one or more computers, a visual representation of the information representing structure of the plurality of semi-structured documents, the visual representation comprising graphical elements corresponding to the plurality of fields, wherein,
the information representing the structure of the plurality of semi-structured documents is stored in the computer memory as a tree data structure,
nodes of the tree represent fields of the plurality of fields and leaf nodes represent atomic values,
the visual representation is a graphical tree, and
the graphical elements each comprise a graphical indication of a frequency that corresponding fields appear in the plurality of semi-structured documents;
outputting, by the one or more computers, the visual representation to a display;
receiving, in the one or more computers, information representing a user selection to include one or more particular fields of the plurality of fields in an output data set, wherein the one or more particular fields comprise collections having a plurality of items;
storing the selected particular fields in the output data set as a two-dimensional data structure;
determining a similarity between particular items in a particular collection;
collapsing the particular items in the particular collection into a single graphical element in the visual representation when the similarity between items is greater than a threshold; and
collapsing the tree data structure in memory when the similarity between items is greater than the threshold.

2. The method of claim 1 wherein the plurality of fields and associated values are field-data pairs having a field name and a data value.

3. The method of claim 1 wherein the selected particular fields are arranged as columns in the two-dimensional data structure, and wherein rows in the two-dimensional data structure correspond to values associated with the selected particular fields from the plurality of semi-structured documents.

4. The method of claim 1 wherein graphical elements corresponding to collections are different than graphical elements that do not correspond to collections.

5. The method of claim 1 wherein one or more collections comprise a plurality of values.

6. The method of claim 1 wherein one or more collections comprise a plurality of sub-documents.

7. The method of claim 1 wherein the selected particular fields comprise one or more collections, the method further comprising flattening the collections, said flattening comprising, in response to a first user selection, incorporating the plurality of items in the collection as columns in the two-dimensional data structure, and said flattening comprising, in response to a second user selection, incorporating the plurality of items in the collection as rows in the two-dimensional data structure.

8. The method of claim 1 wherein a plurality of fields comprise a plurality of linked collections, wherein an nth element of one linked collection corresponds to an nth element of the other linked collections.

9. The method of claim 8 wherein when an nth element is filtered from one linked collection corresponding nth elements are automatically filtered from the other linked collections.

10. The method of claim 1 further comprising:
generating statistical information about values for a first plurality of fields;
applying a filter to one or more particular fields of the first plurality of fields through the visual representation; and
automatically updating the statistical information about said values for one or more other fields of the plurality of fields based on the filter.

11. A computer-implemented method comprising:
analyzing, by a computer system, a plurality of semi-structured documents in a data store;
generating structural information about the plurality of semi-structured documents;
displaying the structural information as a graphical tree comprising nodes and leaf nodes, wherein nodes represent fields in the semi-structured documents and leaf nodes represent atomic values the nodes and leaf nodes each comprise a graphical indication of a frequency that corresponding fields appear in the plurality of semi-structured documents;
specifying particular nodes to include in an output data set;
extracting, from the data store, particular fields corresponding to the particular nodes from the plurality of semi-structured documents, the particular fields comprising collections having a plurality of items;
storing the extracted particular fields in the output data set as a two-dimensional data structure;
determining a similarity between particular items in a particular collection;
collapsing the particular items in the particular collection into a single graphical element in the visual representation when the similarity between items is greater than a threshold; and
collapsing the graphical tree in memory when the similarity between items is greater than the threshold.

12. The method of claim 11 wherein the plurality of semi-structured documents comprise a plurality of fields having associated values, and wherein the plurality of fields and associated values are field-data pairs having a field name and a data value.

13. A computer system comprising:
one or more processors; and
a non-transitory computer readable medium having stored thereon one or more programs, which when executed by the one or more processors, causes the one or more processors to:
access information representing structure of a plurality of semi-structured documents, wherein the plurality of semi-structured documents comprise a plurality of fields having associated values;
generate a visual representation of the information representing structure of the plurality of semi-structured documents, the visual representation comprising graphical elements corresponding to the plurality of fields, wherein,
the information representing the structure of the plurality of semi-structured documents is stored in the computer memory as a tree data structure,
nodes of the tree represent fields of the plurality of fields and leaf nodes represent atomic values,
the visual representation is a graphical tree, and the graphical elements each comprise a graphical indication of a frequency that corresponding fields appear in the plurality of semi-structured documents;
output the visual representation to a display;
receive information representing a user selection to include one or more particular fields of the plurality of fields in an output data set, the one or more particular fields comprising collections having a plurality of items;
store the selected particular fields in the output data set as a two-dimensional data structure;
determine a similarity between particular items in a particular collection;
collapse the particular items in the particular collection into a single graphical element in the visual representation when the similarity between items is greater than a threshold; and
collapse the tree data structure in memory when the similarity between items is greater than the threshold.

14. The computer system of claim 13 further comprising flattening the collections, said flattening comprising, in response to a first user selection, incorporating the plurality of items in the collection as columns in the two-dimensional data structure, and said flattening comprising, in response to a second user selection, incorporating the plurality of items in the collection as rows in the two-dimensional data structure.

15. The computer system of claim 13 further comprising:
generating statistical information about values for a first plurality of fields;
applying a filter to one or more particular fields of the first plurality of fields through the visual representation; and
automatically updating the statistical information about said values for one or more other fields of the plurality of fields based on the filter.

* * * * *